June 9, 1936.  E. R. HARRALL ET AL  2,043,953
DEFLECTION DYNAMOMETER
Filed March 17, 1934
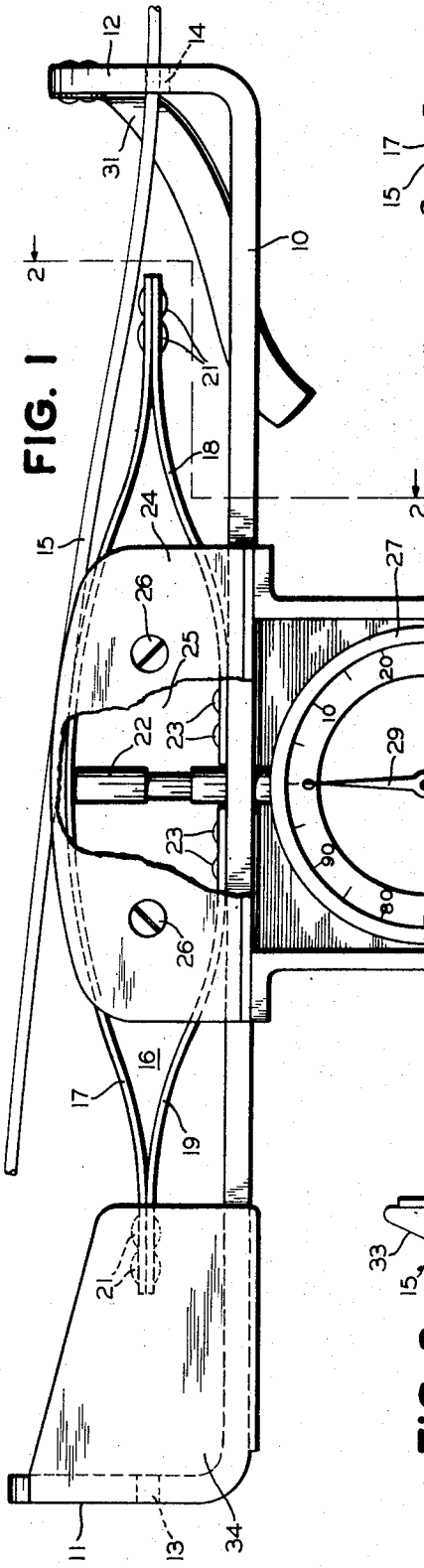
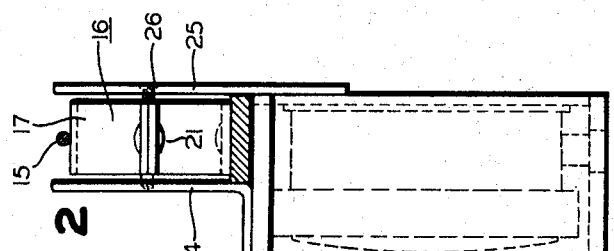
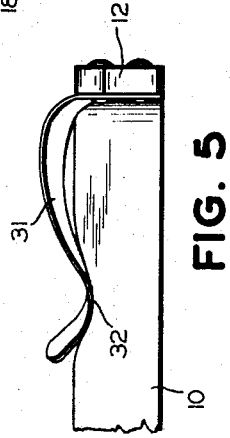
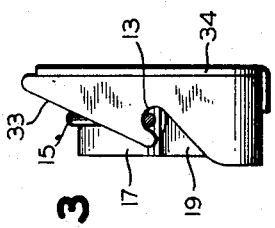
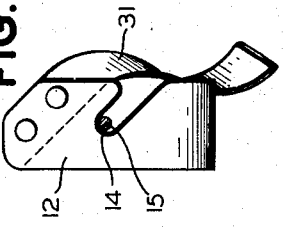
INVENTORS
E. R. HARRALL
R. D. PARROTT
BY Eugene C. Brown
ATTORNEY Patented June 9, 1936

2,043,953

UNITED STATES PATENT OFFICE 2,043,953

DEFLECTION DYNAMOMETER

Edwin R. Harrall, Englewood, and Robert D. Parrott, West New York, N. J., assignors to The Western Union Telegraph Company, New York, N. Y., a corporation of New York Application March 17, 1934, Serial No. 716,132

11 Claims. (Cl. 265—1.6)

This invention relates to devices for measuring stresses in elements susceptible to transverse deflection. It relates primarily to means for measuring deflection in members under stress such as wires, cables, ropes and the like and for determining the tension stresses in such members as a function of the stresses measured by the device. These devices are ordinarily known as deflection dynamometers or tensiometers and involve means for producing a predetermined transverse deflection in a predetermined length of the strand and means for measuring the force required to produce the deflection.

Deflection dynamometers of the type to which this invention relates usually embody a suitable framework having means to engage a predetermined length of a strand ordinarily at three points with means for forcing the engaged portion out of its normal longitudinal alinement by setting one of the force producing elements to act in opposition to the other two. Ordinarily the means engaging the strand at the outer points are termed the arms and the means engaging the strands at the central point is termed the fulcrum. In order to measure the force required to set up the deflection in the strand a spring or an equivalent stress measuring member is associated either with the fulcrum or one of the contact arms. The most common type of deflection dynamometer involves a beam of a given length having a spring or other yieldable member for acting against the fulcrum and means for applying a deflecting force to the fulcrum comprising either the spring alone under stress or means for moving the fulcrum support with respect to the beam for applying through the spring the deflecting force. In substantially every case the deflecting force is determined by measuring the movement of the spring or yielding member which is proportionate to the resistance of the strand to deflection. This resistance to deflection is likewise in proportion to the tension of the strand from which may be determined the actual tension stresses upon the strand.

The principal object of this invention is to provide a deflection dynamometer of simple, rugged, and inexpensive construction which at the same time has a high degree of accuracy within the limits of its intended operation.

Another object of this invention is to provide a simple and rugged spring of approximately elliptical form which may be easily assembled and attached firmly to the frame or beam of the device and which will at the same time retain its accuracy over long periods of use.

Another object is to provide means for varying the stiffness of the stress measuring spring so as to change the effective range of the instrument.

Another object is to provide means, in connection with the hook at one end of the beam or framework, which will prevent the instrument from falling from a line or strand over which the hook has been placed.

Another object is to provide means which will also be advantageous in fastening the instrument or device to the person of the user such as to the lineman's belt.

Still another object is to provide means, in connection with the hook at the other end of the framework, for properly alining the wire or strand with respect to its contact with the spring member as the instrument is placed in tension measuring position on the strand.

Still another object is to provide an arrangement for placing the indicating mechanism external of the elliptical spring so that its spring may be constructed with a relatively small minor axis.

These and other objects will be apparent from the following description and claims taken in connection with the accompanying drawing, in which:

Fig. 1 is a view in elevation of the device;

Fig. 2 is a view taken along line 2—2 of Fig. 1 with the details of the arms omitted;

Figs. 3, 4 and 5 are views showing details of the arms at the left and right ends; and Fig. 6 is a fragmentary detail view of a modified form of spring.

Heretofore in constructing a deflection dynamometer the general object appears to have been to construct a device having a substantially universal application to measuring tensions in wires, cables, ropes and the like of a wide variety of sizes and stresses. As a result the devices so constructed have been rather complicated and delicate in nature and at the same time high in cost.

It is the purpose of this invention to provide a device of extremely simple construction which may be made of rugged and inexpensive parts and which will at the same time measure tensions within a predetermined range with extreme accuracy. With the type of device herein to be described, owing to its low cost per unit, a predetermined relatively wide range of circumstances may be covered by a number of units at even less cost than a single instrument for universal application. Where the tensions to be measured and the wires or strands involved are within relatively narrow limits, it is obvious that the user is not put to the expense of a complicated costly instrument.

According to a modification of the invention a simple means is provided for changing the stiffness of the fulcrum spring for extending the range of the instrument within certain limits.

For a better understanding of the invention reference will now be had to the drawing showing the invention. In its preferred embodiment the device comprises a framework embodying a beam member 10 having its opposite ends turned upwardly to form hook arms 11 and 12. The arms 11 and 12 embody hooks 13 and 14 respectively, (Figs. 3 and 4), which may engage a section of the wire 15, the tension of which is to be measured, at spaced points equivalent to the length of the beam 10. The device is illustrated in Fig. 1 as about to embrace the wire 15.

Mounted centrally upon the arm 10 is a spring 16 of approximately elliptical form, the upper portion of which is arranged to engage the embraced section of the wire at its central point and form the fulcrum. The spring has a height sufficient to cause the wire engaging portion to normally stand at a predetermined position beyond a straight line connecting the hooks 13 and 14 at the opposite ends of the beam. Therefore, when the instrument is placed upon a section of wire so that the embraced portion passes from the hook 14 over the center of the spring 16 to the hook 13 it will be deflected out of a straight line position by the force of the spring. The wire tending to assume a straight line position will force the spring down until there is a balance reached between the resistance of the spring and the straightening effort of the wire. This point of balance will occur at various compressions of the spring, always in proportion to the tension of the wire.

Referring particularly to Figures 1 and 2 the spring 16 comprises a plurality of preshaped elements which may be made from regular stock bars of spring steel or the like of suitable dimensions. The elements are an upper leaf 17, extending the full length of the spring, and a split lower leaf forming two halves 18 and 19. The upper leaf is shaped with its central portion bowed upwardly and its ends extending outwardly in horizontal alinement. The lower leaf comprises two sections 18 and 19. They generally conform in shape to the upper leaf so that the whole spring assembly may flex as a unit substantially free from longitudinal stress. The flat or horizontal outer end portions of the sections 18 and 19 are secured to the upper leaf 17 by means of rivets 21 or other suitable means. The inner ends of the sections are spaced apart a sufficient distance to admit the plunger 22. The inner ends embody a short flat section which is secured rigidly to the beam 10 by means of a pair of rivets 23 or other suitable fastening means.

By providing a spring of a plurality of parts rigidly secured together and rigidly secured to the beam of the framework, a spring assembly is obtained which embodies substantial transverse rigidity with respect to the framework and which is at the same time readily yieldable in its plane of action and sufficiently sensitive to incorporate a high degree of accuracy. Accuracy also results from the simplicity of the parts comprising the spring and the simple and accurate method of assembly of the parts. A spring of a type herein described embodying substantial transverse rigidity is less apt to slide from beneath the wire when the instrument is being placed thereon. This is a distinct advantage over less sturdy types of springs which are removably mounted to the framework or are mounted upon a movable element by means of which the spring is to be adjusted with respect to the beam of the framework.

According to the modification of this invention, a fragmentary view of which is shown in Fig. 6, the range of the spring 16 may be changed so that the instrument will act properly to measure the tension in wires and cables of substantially different sizes. In the preferred form of the modification the change is accomplished by employing bolts 21' in place of the rivets 21 employed in Fig. 1 so that the upper leaf of the spring 17 may be replaced by a leaf 17' having a greater or less thickness which will increase or decrease the combined stiffness of the spring according to whether it is desired to extend the range upwardly or downwardly from the original range of the device. It is noted that this modification does not alter or change the simplicity of the device and the ruggedness and accuracy of the construction.

Obviously, the range of the spring 16 may be changed in various other ways such as by adding leaves of any desired thickness to the original leaf 17 of the spring. It may also be changed by employing bolts in the place of rivets 23 in the preferred embodiment illustrated in Fig. 1 so that the entire spring may be removed and a spring of a different scale substituted therefor. It is to be noted in this case, however, that it will be necessary to make either the plate 24 or 25 or both easily removable so that access may be had to the bolts which would fasten the spring to the beam. Obviously, other means of variation of the scale or range of the spring will occur to those skilled in the art and which will avoid the error of prior art devices of providing a thrust action spring having insufficient transverse rigidity.

In order to protect the spring when the instrument is in use and to assist in guiding the wire to be tested, side plates 24 and 25 are arranged to extend upwardly from the beam to cover the central portion of the spring. The upper edges of the plates extend beyond the normal extended position of spring to form guide members for the wire. The plates are usually positioned close to the sides of the spring so as to prevent the wire from entering the space between the plates and the edges of the spring. In order to make the upper edges of the plate adjustable with respect to their distance from the spring, screws 26 or other suitable adjusting means may be provided for drawing the plates together.

It will be observed that according to this invention the dial or indicator mechanism is located entirely externally of the measuring spring 16. This enables the spring to be constructed with a relatively short minor axis giving a greater compactness and flexibility. It will be observed also that the connection with the movable portion of the spring is provided in the most direct manner, that is, by providing an opening in the stationary side of the spring to admit the stem 22 which projects across the minor axis of the spring and connects the movable side with the dial indicator operating mechanism. This type of an arrangement is particularly adapted to permit the use of any suitable type of standard make of dial indicator such as those known in the art as thickness gages or indicators. With the type of arrangement just described no special apparatus is required. All of the parts may be made of standard materials.

Since the movement of the spring, as already has been stated, is in proportion to the tension of the wire, likewise the readings of the gage which are determined by the movement of the spring are in proportion also. Therefore the dial of the gage may be calibrated to read the tension of the wire direct where the instrument is to be applied to the same type of wire at all times. If it is desired to apply the instrument to different types of wire, the dial of the gage may be calibrated with an arbitrary scale such as 100 equal divisions. The latter is the form illustrated in the drawing and preferred in the present embodiment. A calibration chart or curve is prepared when the arbitrary scale is used so that the dial readings may be readily transferred to tension units, preferably pounds, corresponding to the wire being measured.

The gage 27 is illustrated as having a dial 28 and a hand 29. The dial is calibrated to indicate thousandths of an inch in the movement of the plunger 22. The gage is mounted in a protecting housing 30 secured to the lower side of the beam 10. The housing preferably includes a solid back plate to which the gage is secured by any siutable fastening means and an open front. It is preferred that the upper end of the plunger 22 shall be spaced slightly from the normally extended position of the spring 16 so as to insure that the hand of the gage will always return to zero when the instrument is not in use. A very small space between the stem and the spring does not materially affect the accuracy of the instrument since it is seldom that a tension is so slight as not to bring the spring into engagement with the pin. In all other cases this space would be compensated for in the calibration of the instrument and would cause no error in the reading. The advantage of permitting the dial to always return to zero is to prevent attempts of persons not versed in the theory of the operation of the instrument to adjust the instrument to zero, destroying the accuracy of the accompanying calibration curve. It also largely removes the possibility of unskilled persons doubting the accuracy of the instrument.

In order to add to the practicability and usefulness of the device it has been provided with the safety clip 31 secured to the upper portion of the arm 12 above the slot which forms the hook 14. It extends outwardly transversely of the arm in an inclined direction from the nose of the hook. By this arrangement the clip member serves as a guide to direct the wire into the slot 14 when the instrument is being mounted upon the same. The outward end of the clip member is bent backward at an incline so as to engage the beam 10 back from the arm 12. The clip member is preferably comprised of a leaf spring which is formed so that the outward end is pressed against the beam. The spring extends beyond the point where it engages the beam and is bent outwardly so as to engage the wire or other rod which is to be passed into the hook. This spring also enables the instrument to be clipped for carriage to some part of the clothing of the user, such as a lineman's belt. When it is about to be mounted on a wire or rod, the clip is slipped over the wire so that the instrument will be secured safely thereto, even though it should slip from the hand of the user while pressing the wire into the hook 13 at the other end. Should it slip it will merely hang or dangle from the wire at the right end. A clip member in the form of a spring provides a readily usable feature together with safety.

Assuming that the device is to be employed for measuring the tension of a wire strung upon telegraph poles, the user with the instrument held with the beam 10 in a somewhat vertical direction, catches the wire 15 between the outward end of the clip 31 and the point where it engages the beam. He then pulls the instrument downwardly until the wire passes behind the safety clip. If he so desires he may release or let go of the instrument at this point and it will hang upon the wire, being retained by the action of the safety clip as is well understood. The recess 32 in the beam into which the outer curved end of the spring fits adds to the effectiveness of the clip in preventing the wire from accidentally passing out again should the instrument be violently swung while it is hanging loosely upon the wire.

The manner in which the instrument may be mounted in position to indicate the tension will now be described. From swinging position the instrument is alined as shown in Fig. 1 with the wire resting in the hook 14 and passing over the top of the elliptical spring 16 and in position above the hook 13 formed in the arm 11, at the opposite end of the beam. Since the spring 16 is relatively rigid transversely of the device, no difficulty will be experienced in placing the wire in a substantially central position upon the spring. With the wire in this position and preferably with the fingers of the hand clasped around the left end of the beam 10, the thumb is brought up to catch the wire outwardly of the arm 11. With the thumb the wire is forced downwardly along the cam face 33 formed by the portion of the arm extending beyond the hook 13. The wire is caused to slide along this cam face until it snaps into the hook, the instrument then being mounted upon the wire in such a manner that the portion embraced between the two arms 11 and 12 is deflected by the spring 16 by an amount proportionate to the tension of the wire. The resistance of the wire to deflection presses the spring 16 inwardly which by its engagement with the stem 22 causes the pointer 29 of the indicator 27 to indicate the movement of the spring. By suitable calibration tables the readings of the dial can be transferred into readings which indicate the tension of the wire.

Referring to Figure 3, the cam surface of the upper portion of the arm is formed in a definite relation with the position of the hook, and the central point of the upper leaf of the spring 16. The face of the surface is inclined backwardly from the nose of the hook an amount such that, with the wire positioned centrally of the spring 16 and brought to a position substantially parallel with the beam 10, it will engage the surface at a point substantially vertically above the hook. When the wire is brought into engagement with the cam surface it will have already been pressed firmly upon the spring and, even though it must swing to one side to pass beyond the nose of the hook, there is little tendency for the wire to be displaced from its central position upon the spring.

Due to the fact that care must be exercised in avoiding kinks in the portion of the wire embraced between the hooks 13 and 14, a plate 34 is placed so as to extend inwardly from the arm 11 to insure that the operator in placing his thumb or hand upon the wire to force it into position will grasp the wire on the outside or beyond the arm 11 rather than inside of the arm.

From the above description it will be seen that a tensiometer or deflection dynamometer has been devised in an extremely simple and rugged form and which may easily and readily be adapted to perform the operation of measuring tensions or other forces in wires, rods and the like which may be measured by deflecting a predetermined length thereof. Due to the simplicity and ruggedness of the device its accuracy will be maintained under substantially all conditions and will not be materially affected by the type of use to which it is put nor the temperature or weather conditions when employed in exposed localities. In addition a device constructed according to this invention may be readily used by inexperienced persons.

The details and principles of this invention will readily suggest themselves for use in various other forms or adaptations as will be apparent to those skilled in the art.

Although this invention has been shown in but two forms, it will be apparent to those skilled in the art that it is not so limited, but is susceptible to various other changes and modifications without departing from the spirit thereof and it is desired, therefore, that only such limitations shall be placed thereupon as are imposed by the prior art or as set forth in the appended claims.

What we claim is:

1. A tensiometer having a beam embodying hook members at its ends for engaging at spaced points a strand of material, the tension of which is to be measured, a spring of elliptical type embodying upper and lower members, and an extensible element disposed to be acted upon by the upper member of said spring as it moves, said lower member being divided substantially at the mid point into two parts separately secured to the beam, said parts being secured with their inner ends spaced apart for admitting the extensible element from a point external of the spring, said upper member being rigidly secured to the lower member and arranged with its uppermost portion in disalignment with said hook members and pressing upon said strand substantially centrally between said hooks to effectuate a deflection in said spring.

2. A deflection dynamometer of the type having a beam provided with means at its ends to embrace a portion of a wire, the tension of which is to be measured, and a spring of elliptical type rigidly secured to said beam, said spring being formed with upper and lower members of ribbon metal stock of substantially uniform section, the outer ends of the respective members being secured together so as to form a spring unit, said unit being secured so that its uppermost portion is in disalignment with said wire embracing means and in position to deflect the embraced portion of the wire by engaging said embraced portion substantially centrally thereof.

3. In a deflection dynamometer having a beam carrying engaging members for embracing a section of a strand of material to be tested, a resilient fulcrum member secured to the beam between the engaging members and arranged to press upon said strand for producing a deflection thereof proportionate to the stiffness of the fulcrum member, said fulcrum member comprising an elliptical spring, a dial type deflection indicator secured to said beam in a position externally of said spring and having an extensible stem, the side of the spring secured to said beam being provided with an opening for admitting the stem of said deflection indicator to engage a leaf of said spring internally thereof and to permit the longitudinal movement of said stem.

4. In a deflection dynamometer having a beam carrying engaging members for embracing a section of a strand of material to be tested, a resilient fulcrum member secured to the beam between the engaging members and arranged to press upon said strand for producing a deflection thereof proportionate to the stiffness of the fulcrum member, said fulcrum member comprising an elliptical spring, a deflection indicator secured to said beam in a position externally of said spring and having an extensible stem, the side of the spring secured to said beam being provided with an opening for admitting the stem of a deflection indicator, said stem being disposed to extend across said spring to engage the free side when the spring is compressed, said stem and said free side of the spring when in their normal extended positions being separated by a space sufficient to prevent the spring from engaging the stem when at rest, whereby the pointer of the indicator will rest at its full retarded position.

5. In a deflection dynamometer device for testing rods, strands, and the like, a beam having upstanding arms adjacent its ends for embracing a section of a strand, an elastic member for deflecting the embraced strand, hooks provided on said arms, a resilient spring secured to one of the arms above the hook opening and arranged to extend beyond the nose of the hook for forming a guide member for directing the strand into the hook as the device is placed thereon.

6. In a tensiometer device for testing wires, cables and the like, a beam having upstanding arms adjacent its ends for embracing a section of a strand, an elastic member for deflecting the embraced strand, hooks provided on said arms, a resilient spring secured to one of the arms above the hook opening and arranged to extend beyond the nose of the hook, the outer end of the spring member being bent backwardly to extend from the arm across said beam so as to form therewith a safety clip for insuring that the device is retained upon the strand during manipulation.

7. In a deflection dynamometer device for testings rods, strands, and the like, a beam having upstanding arms adjacent its ends for embracing a section of a strand, an elastic member for deflecting the embraced strand, hooks provided on said arms, one of said hooks being provided with a cam guiding surface embodied in a portion of the arm extending above said hook, the cam surface of said portion being arranged to incline backwardly from the nose of the hook for guiding the strand into the hook as it is brought down across the deflection member, said guiding cam surface being disposed so that as a strand positioned centrally of the elastic member comes down to substantially parallel with said beam, it will engage said cam surface directly above the resting place of the strand in the hook.

8. In a deflection dynamometer device for testing rods, strands, and the like, a beam having upstanding hooks formed at the ends for embracing a length upon which a test is to be made, an elastic spring having a flat top for engaging the length to deflect the same, one of said hooks having a portion extending upwardly and backwardly from its nose and embodying a cam surface for forming a guide and aligning member, said cam portion being so disposed that the transverse projection of its surface lies within the projection of the flat top of said spring.

9. A tensiometer having a beam embodying hook members at its ends, means to embrace a portion of a strand of wire or the like, the tension of which is to be measured, and a spring of elliptical type embodying a lower member fixedly secured to said beam, said lower member being arranged to have secured thereto a replaceable upper member whereby the flexibility of the spring as a whole may be changed by inserting an upper member of different stiffness to convert the tensiometer to a different scale of measurement.

10. A tensiometer having a beam embodying arms at its ends for embracing at spaced points a strand of material, the tension of which is to be measured, a spring of elliptical type embodying a fixed lower member and a replaceable upper member, said lower member being secured to said beam at points on either side of its mid-portion and spaced from said mid-portion, and an extensible element mounted independently of but disposed to be acted upon by the upper member of said spring as it is deflected, guide means for the extensible element for holding it erect, said lower member embodying substantially at its mid-point an opening for admitting the extensible element and its guide means from a point externally of the spring whereby said upper member may be changed for altering the range of measurement of the tensiometer without disturbing or changing any part of the extensible element.

11. A deflection dynamometer of the type having a beam provided with arms at its ends for embracing a section of a strand of material, the tension of which is to be measured, a spring of elliptical type rigidly secured to the inner side of said beam between said arms for forming a resilient fulcrum member arranged to press upon said strand for producing a deflection thereof measurable by the concomitant deflection of the fulcrum, a deflection indicator secured on the outside of said beam opposite said spring and having an extensible stem, the beam between the spring and indicator and the side of the spring secured to said beam being provided with an entrance way for admitting said stem, said stem being disposed to extend from the indicator loosely through said way and across said spring for engaging the free side of said spring whereby a compressional displacement of the spring is transmitted to the indicator by the longitudinal movement of said extensible stem.

EDWIN R. HARRALL.
ROBERT D. PARROTT.